United States Patent [19]

Glossop et al.

[11] 4,111,296

[45] Sep. 5, 1978

[54] ROCK CONVEYORS

[76] Inventors: Mark B. Glossop, 11 Westview Dr., Bryanston Ext. 5, Randburg; Adrian C. Buckmaster, 29 Clonmore Rd., Bryanston 7; Neville G. W. Cook, 118 Mattie Ave., Parkmore, Sandton; Justin P. M. Hojem, 52 Buffalo Rd., Emmarentia, Johannesburg; Noel C. Joughin, 14 Kerry Rd., Parkview, Johannesburg; Richard F. Taylor, Meadowvale, Plot 179, Tuohyvale, Dist. Krugersdorp; Robert W. Cramp, 3 Sable Rd., Verwoerd Park, Alberton; John L. Hatcher, 153 Monterey, 27 Lily Ave., Berea, Johannesburg, all of South Africa

[21] Appl. No.: 812,651

[22] Filed: Jul. 5, 1977

Related U.S. Application Data

[63] Continuation of Ser. No. 589,759, Jun. 24, 1975.

[30] Foreign Application Priority Data

Jun. 25, 1974 [ZA] South Africa ............... 74/4077
Mar. 20, 1975 [ZA] South Africa ............... 75/1750
Mar. 20, 1975 [ZA] South Africa ............... 75/1751

[51] Int. Cl.² ............................... B65G 25/10
[52] U.S. Cl. ............................... 198/519; 198/745; 198/746; 198/862; 299/64
[58] Field of Search ............... 198/519, 520, 522, 734, 198/746, 749, 735, 862, 864, 506, 739, 742, 745; 299/13, 18, 45, 64, 65, 67; 59/78.1, 90

[56] References Cited

U.S. PATENT DOCUMENTS

| 409,568 | 8/1889 | Dodge | 198/520 |
|---|---|---|---|
| 1,661,087 | 2/1928 | Powell | 198/522 |
| 1,773,416 | 8/1930 | Warden | 198/520 |
| 1,863,085 | 6/1932 | Crawford et al. | 198/745 |
| 2,417,128 | 3/1947 | Roesch | 198/741 |
| 2,467,988 | 4/1949 | Petraske | 198/748 |
| 2,533,676 | 12/1950 | Matthews et al. | 198/745 |
| 2,559,541 | 7/1951 | Martin | 198/741 |
| 2,590,802 | 3/1952 | Tramblay | 198/735 |
| 2,629,484 | 2/1953 | Thomson | 198/735 |
| 2,674,364 | 4/1954 | Cartlidge | 198/864 |
| 2,869,713 | 1/1959 | Duncan | 198/735 |
| 2,951,582 | 9/1960 | Petraske | 198/748 |
| 3,047,129 | 7/1962 | Wiener | 198/735 |
| 3,363,946 | 1/1968 | Willner et al. | 198/519 |
| 3,480,130 | 11/1969 | Kerschek | 198/519 |
| 3,504,864 | 4/1970 | Kurlandsky | 59/78.1 |
| 3,625,567 | 12/1971 | Blumenthal et al. | 198/735 |
| 3,842,966 | 10/1974 | Blumenthal et al. | 198/862 |

FOREIGN PATENT DOCUMENTS

| 507,765 | 12/1951 | Belgium | 198/862 |
|---|---|---|---|
| 1,331,264 | 11/1963 | France | 198/746 |
| 1,015,112 | 7/1954 | France | 198/864 |
| 656,580 | 1/1938 | Fed. Rep. of Germany | 198/735 |
| 546,485 | 2/1932 | Fed. Rep. of Germany | 198/860 |
| 596,749 | 8/1959 | Italy | 198/746 |
| 78,032 | 12/1954 | Netherlands | 198/735 |
| 4,437,622 | 2/1968 | Switzerland | 198/736 |
| 804,246 | 11/1958 | United Kingdom | 198/520 |
| 1,378,949 | 1/1975 | United Kingdom | 198/862 |

Primary Examiner—Evon C. Blunk
Assistant Examiner—Richard K. Thomson
Attorney, Agent, or Firm—Stevens, Davis, Miller & Mosher

[57] ABSTRACT

This invention is conerned with conveyors using reciprocating flights to convey material along the length of the conveyor. The conveyor consists essentially of a bed of articulated plates, a track constraining a chain adjacent a first longitudinal edge of the bed, spaced flights attached to the chain and located to extend across the bed and means for reciprocating the chain along the track. The chain is preferably made of rigid members of substantially uniform cross-section and the flights are shaped bars having one end adapted to be pivotally attached to the chain and are reduced in their height towards their free ends with the trailing edges of each flight tapered downwardly towards their bottom surfaces and inclined towards the leading edges at their free ends which ends are chamfered. The flights include stops to limit their rotational movement over the bed and reciprocating means comprises a piston and cylinder assembly which may be connected to the chain through a flexible member passed over a system of pulleys to increase the effect of the working stroke of the assembly on the chain.

19 Claims, 15 Drawing Figures

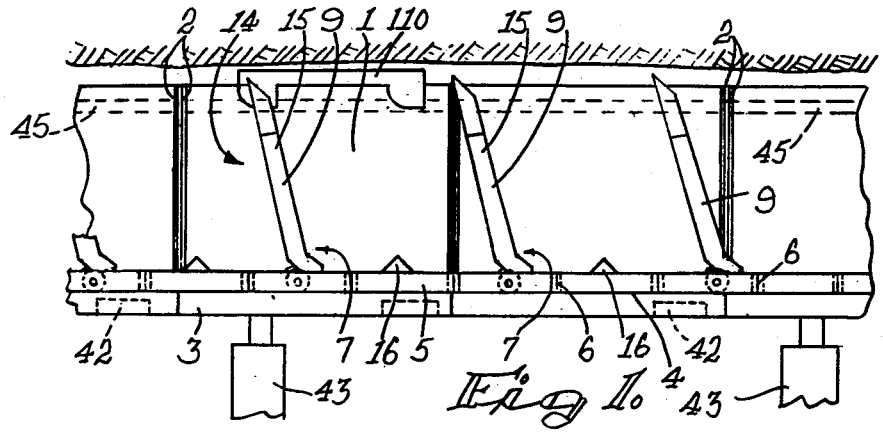
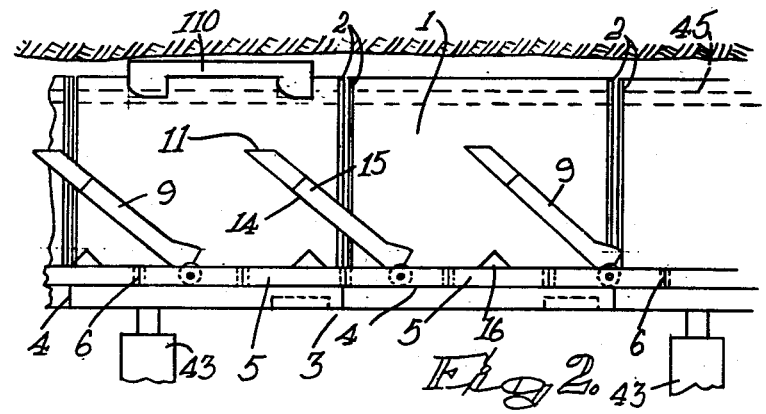
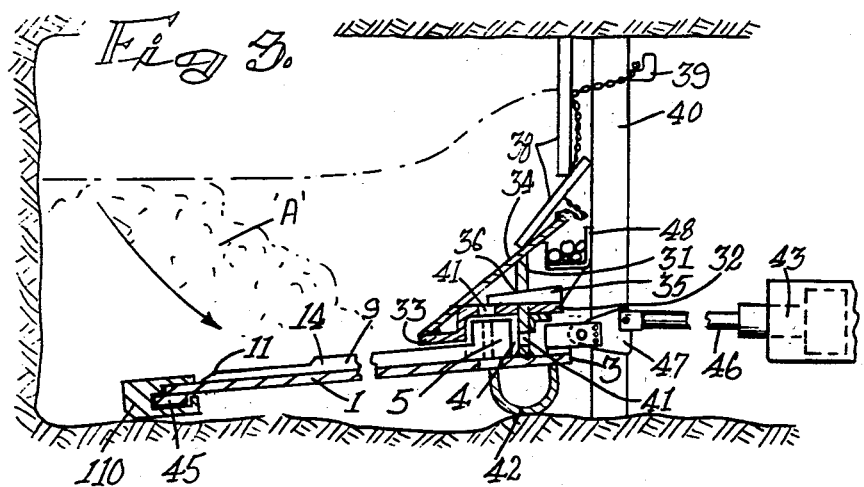

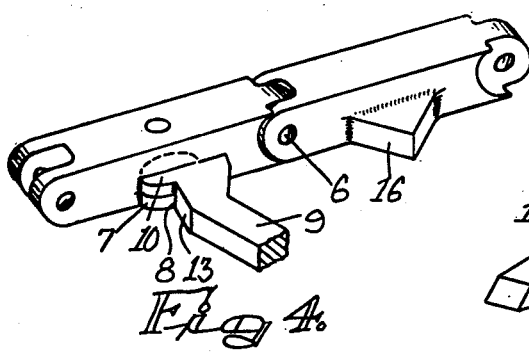
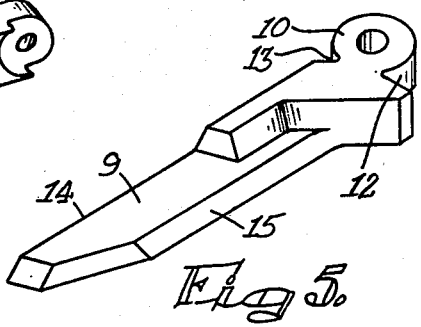
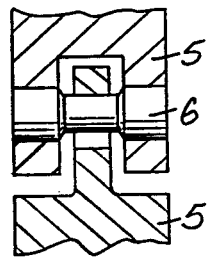
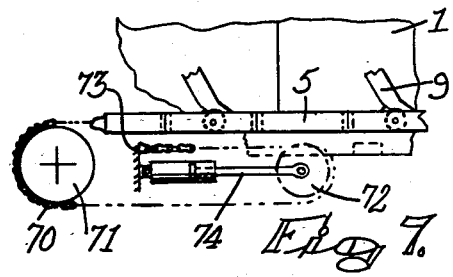
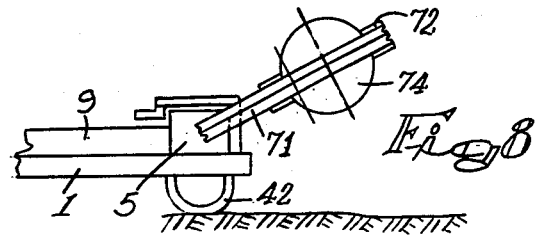
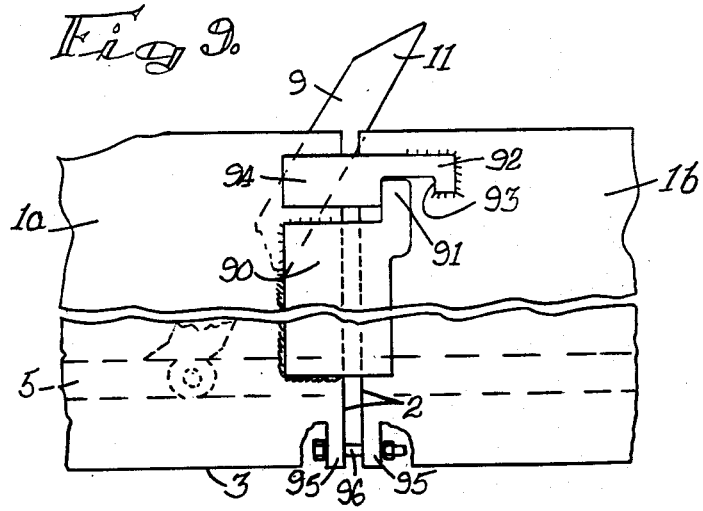

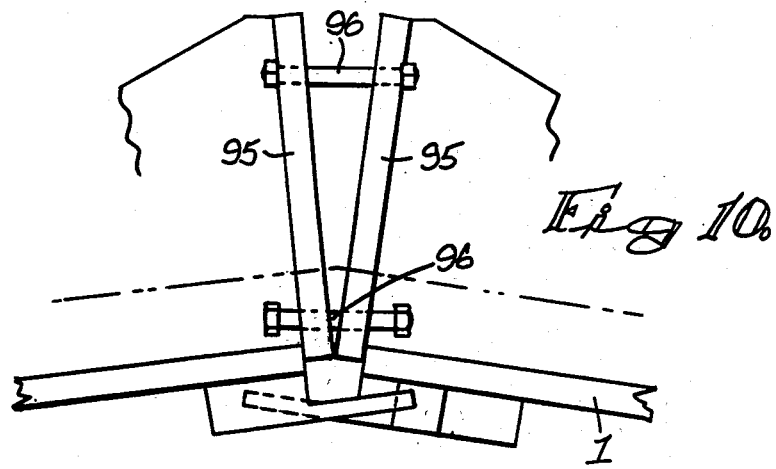
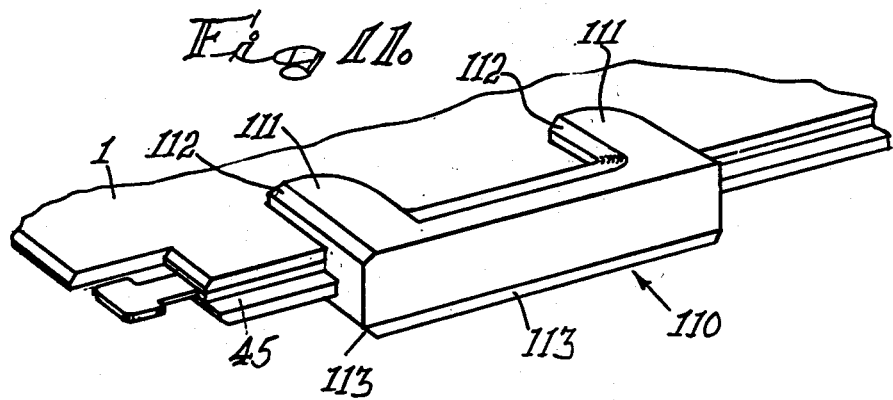

ROCK CONVEYORS

This is a Continuation of application Ser. No. 589,759 filed June 24, 1975.

BACKGROUND TO THE INVENTION

THIS INVENTION relates to rock conveyors and more particularly to a conveyor which can be used in confined spaces such as are often encountered in underground mining operations.

BRIEF SUMMARY OF THE INVENTION

The object of this invention is to provide a robust conveyor particularly for rock which is simple in construction and effective in use and which includes means to facilitate the advance of the conveyor over rough and undulating surfaces.

The word chain used hereinafter is considered to include in the ambit of its meansning chains, ropes and other elongated members including flexible or rigid elements.

According to this invention there is provided a rock conveyor comprising a bed of articulated plates, a track constraining a chain adjacent a first longitudinal edge of the bed, spaced flights attached to the chain and located to extend across the bed and means for reciprocating the chain along the track.

Further features of this invention provide for the chain to comprise rigid members hinged together between adjacent flights, for the rigid members to carry deflectors projecting from the chain track onto the bed, for the flights to be hinged to the chain, and for stops to be provided to limit the rotational movement of the flights about their hinge points and over the surface of the bed.

The invention also provides for the free ends of the flights to be chamfered, for the height of each flight to be reduced towards the free end and for the trailing edges of the flights to be tapered downwardly towards the bed.

Still further features of the invention provided for the bed to include a predominantly continuous rib on its underside parallel to and adjacent the second longitudinal edge thereof, for said reciprocating means to comprise at least one piston and cylinder assembly connected to the chain, for the connection to be a flexible member which may pass over a system of pulleys, for the stops to limit the rotational movement of the flights to orientations in which they define angles of less then 90° with the chain, for at least one support member to be attached to the underside of each plate adjacent the first longitudinal edge thereof to incline the bed to the supporting surface in use and for ancilliary equipment to be attached to the bed by means of wedges engaging the equipment and the base.

Yet further features of the invention provide for the free ends of the flights to be capable of extending up to or beyond the second longitudinal edge of the bed and for at least one device to be mounted adjacent the second edge of the bed which projects beyond and below this edge and below the bed, means being included to reciprocate the device along this edge.

These and numerous other features of the invention will become apparent from a preferred embodiment of the invention now described. In this embodiment, reference is made to the accompanying drawings in which:

BRIEF DESCRIPTION OF THE DRAWINGS

FIGS. 1 and 2 are diagrammatic plans of part of a rock conveyor with track and spill plate assemblies removed;

FIG. 3 is a partly sectioned diagrammatic side view of the conveyor;

FIG. 4 is an oblique view of the chain hinge and flight assembly;

FIG. 5 is an oblique view of a flight;

FIG. 6 is a sectioned plan of the chain hinge assembly;

FIGS. 7 and 8 illustrate reciprocating means at one end of the assembly;

FIG. 9 is an inverted plan of the means for joining two adjacent plates of the conveyor bed;

FIG. 10 is a rear elevation of the bed showing the joining of two adjacent plates;

FIG. 11 is an oblique view of a device mountd on the front edge of the conveyor;

DETAILED DESCRIPTION OF A PREFERRED EMBODIMENT OF THE INVENTION

Figure 12:
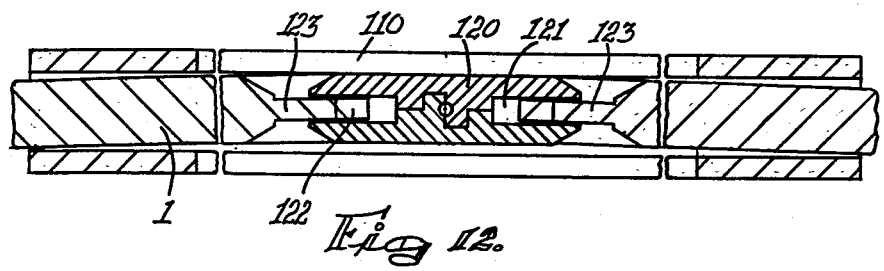
FIG. 12 is partly sectioned diagrammatic view of the front edge of the conveyor bed at the joint between plates with the joining hooks omitted.

The conveyor of this example is suitable for use in underground mining operations where the rock is broken either by blasting or other means. Basically it consists of an arrangement of conveying flights which are reciprocated by a chain over a bed assembly to convey material down the length of the conveyor.

The conveyor consists of a bed 1 formed from contiguous lengths of steel plate articulated together at abutting ends 2. The joints between the plates are made such that individual plates can be readily removed and replaced in the bed when necessary. A panel on the underside of one plate is made to overlap the abutting edge of the other to close the gap between these edges. The latter are chamfered towards the panel so that the shape of the gap is such that material falling therein is easily removed and also facilitates the passage of a flight thereacross.

Along a first longitudinal edge of the bed, which in FIGS. 1 to 3 is the rear edge, a track 4 is formed for a chain 5 which carries flights 9 hingedly secured thereto. Means are included for reciprocating the chain along the track.

Preferably the plates are joined in a manner such that relative limited vertical and horizontal movement between adjacent plates is allowed. The amount of the movement allowed will be determined from the requirements in each different conveyor application. Briefly, and as illustrated in FIGS. 9 and 10, the articulation at every pair of abutting edges 2 adjacent the second longitudinal edge, which is the front edge of the bed, is achieved by means of a projection or arm 90 made of steel plate and secured by welding (indicated by crosshatching) to the underside of one plate 1a. The arm projects away from the edge 2 of the plate at right angles thereto and the end portion of the arm has a projection 91 extending therefrom which is parallel to the plane of the plates to form a hook.

A U-shaped member 92 made of steel plate is welded to the other plate 1b near the edge 2 thereof and forms a socket is located within the bounds of the plate 1b but the one limb 94 of the member 92 projects in width beyond the corresponding plate edge. The width of the socket 93 is greater than the width of the hook 91 and the extension of limb 94 must be greater than the difference between the width of the socket and the hook.

The arm 90 can also conveniently be extended rearwardly to form the panel described above to close the underside of the gap which may occur between adjacent plates.

The plates, adjacent the rear longitudinal edge 3 of the bed, may be attached together by any suitable means to allow limited relative movement of the plates without the end portion 91 of each arm becoming disengaged from the corresponding socket 93 of the U-shape. In this particular embodiment the connecting means comprises an upstanding flange 95 secured to each plate. Each flange extends to the major surfaces of the corresponding plate and sustantially above and below the center line of the chain. Each flange is further orientated within its major surfaces parallel to the corresponding plate edge 2. Shoulder bolts, pins or the like 96 connect the adjacent end portions of the flanges 95 such that limited movement of the flanges, and hence the plates, toward and away from each other, is allowed.

FIG. 10, illustrates the effect of using flanges 95 in the assembly. The lower ends of flanges 95 are shown to be in contact where the plates 1 are shown to accommodate a convex formation on the floor. These lower ends are located within the thickness of plates 1 and the retaining bolts 96 are located through the flanges on opposite sides of the centre line of the chain. It is clear from this illustration that any tension on the chain centre line will tend to draw the flanges 95 together and bring the bed into a horizontal or flat orientation.

Also, the greater the distance between the chain center line and the ends of the flanges the greater this tendency will be. The further the ends of the flanges are from the opposite bolt the less will be the tension applied to that bolt by any given moment exerted on the conveyor.

FIG. 10 also illustrates the flexibility afforded to the assembly through the use of the socket 93 and projection 91 which arrangement allows for limited relative movement between abutting plate edges and this movement can take place in either the vertical or horizontal planes.

Each plate has two flanges 95 one at each end, a projection 90 and a projecting U-shaped member 92 secured thereto near opposite ends thereof and the articulated bed is formed by a plurality of plates located contiguously with each hook 91 located in the respective U-shaped member 92 on the adjacent plate and with the flanges connected. As outlined above this arrangement gives adequate degrees of vertical and horizontal articulation to the conveyor bed during use.

The chain 5 in this embodiment, and reference is made here to FIGS. 1 to 6, is made of rigid lengths of square or rectangular or other substantially uniform cross-sectioned bars hinged together using joint pins 6 which may be arranged either vertically or horizontally with respect to the bed. Alternatively the chain may include a combination of both vertical and horizontal pins 6, or be linked to afford universal type relative movement between the chain lengths. It has been found that the use of joint pins 6 in the chain links arranged horizontally relative to the surface of the bed 1 can be arranged to allow for any usual vertical variation to be encountered in mining operations. This arrangement also allows the bed to be made to follow the working face reasonably closely as is also allowed by the manner of articulation described above. The chain members may, however, be made of lengths of externally square section tube having circular internal passages. In this case the members could be threaded onto a rope or other flexible member to form the chain, the use of joining pins or the like being obviated. As illustrated in FIG. 6, the joint pins can conveniently be waisted and pass through apertures in the cooperating end portions of the chain links. This arrangement allows the chain to be relatively easily manufactured assembled and dismantled, the use of nuts or the like being obviated. The pins, in use, are held in position by the tension or compression of the chain holding the larger diameter ends of the pins located in one link out of alignment with the aperture through the other link.

As far as is reasonably possible all relative rotating parts in the conveyor assembly have radiused mating surfaces to reduce the possibility of material to be conveyed being jammed between the parts. This is exemplified by the shaping of the chain bars at the joint pins 6, shown in FIG. 4. It is further illustrated in FIG. 4 where a rounded protrusion 7 is made on the lower part of the chain links 5 to correspond to the inner portions 8 of flights 9 hinged to the chain links 5. The radius of each protrusion 7 is equivalent to the radius of the undercut portion 8 of the flight 9 which may thus be hinged to the chain by means of a pin through a projecting lug 10 on the flight 9.

The construction of the flights 9 along the length of the conveyor include important features of the invention. As shown in FIG. 2 the ends 11 of the flights 9 are chamfered at an angle equal to or less than the angle between the flights 9 and the chain 5 during the return stroke of the reciprocating motion as is described more fully below. This has the effect of giving a maximum area swept by the conveyor during the operative stroke thereof and minimising the area swept during the return stroke of the chain 5 by the flights 9.

The flights 9 are hinged to the chain 5 and constructed so that they include stops 12 and 13, as shown most clearly in FIG. 5, which limit the rotational movement of the flights about their hinge points. Thus during the working stroke the flights 9 are held in orientations in which their conveying front surfaces define angles of approximately 80° with the length of the chain 5 by the stops 12. This angle can be chosen to have a specific influence on the rock being conveyed by having the angle of the flight 9 to the chain 5 either forward or backward of this inclination during the conveying stroke. The construction of the flights so that they have maximum inclinations to the chain of less than 90° affords, however, certain advantages which are outlined below.

The cross-section through each flight 9 is made so that the conveying front surface 14 is vertical while the rear surface 15 is inclined downwardly to the bed 1. This facilitates the passage of the flights under stationary rock on the conveyor during the return stroke of the chain when such rock lies in the path of the return strokeof the flights 9. A further advantage of this arrangement is that rock passing over the flights 9 during the return stroke of the chain 5 comes into contact with the front surface 14 of the flights at an early stage during change over to the conveying motion of the chain 5. It has also been found practical to have the depth of the flight near the free end 11 of a smaller depth than the remaining portion. As described below, the depths of the flights near the discharge end of the conveyor are preferably greater than the other flights.

During return motion of the chain, the stops 13 limit the degree to which the flights 9 may be collapsed against the chain 5. This degree can be varied to meet particular conditions and requirements but is also chosen, along with the shaping of the rear face 15 of the flights 9 to bring material to be conveyed into contact with the working faces 14 of the flights 9 as soon as possible during the working stroke.

It will be appreciated that material which may tend to become lodged between the respective stops 12 and 13 and chain links 5 is, in practice, left behind on the conveyor bed 1 when the chain 5 moves the flights 9 away from this material. Further, deflectors 16, projecting from the chain a short distance over the bed 1 and located between each pair of flights 9 tend to move this material away from the chain. The hinge joints of the flights 9 to chain 5 are such that considerable vertical movement of the end 11 of the flights relative to the chain 5 can be tolerated. This further mitigates the possibility of the material to be conveyed jamming the flights 9 relative to the bed 1.

The deflectors 16 may be made longer to extend a greater distance along the chain. It may be preferable to have these deflectors extending continuously along the length of the chain links between flights. In this case, suitable recesses will be provided in the deflectors to accommodate the projecting flights and the rotation thereof. The ends of the link chain 5 can have hollow extensions thereto so that these extensions can be used to protect the track against the ingress of dirt and rock chips over these areas. Thus when the chain 5 is moved to leave open the end part of the tracks 4 those parts will be shielded by the extensions. However, in cases where it is desireable to have the chain move with a relatively long stroke, protective plates are preferably provided at the ends of the track assembly, described below, to prevent rock fouling the chain.

In this embodiment, the flights are constructed such that, when fully extended, the tips 11 thereof extend up to or beyond the front edge of the bed. This enhances loading and advance of the conveyor as described below.

As illustrated in FIG. 3, the track assembly on each bed plate comprises a plate 31 extending upwardly from the bed 1 and parallel to the edge 3 thereof. A substantially horizontal plate 32 is located on the plate 31 to form the top of the track and the front edge of this plate has a downwardly and forwardly projecting flange 33 thereon which partially encloses the track yet allows the flights to project away from the chain. A spill plate 34 is attached to the plate 32 which is inclined upwardly and rearwardly with its lowest end terminating on the flange 33 forwardly of the chain 5.

The spill plate 34 and the plate 32 attached thereto which forms part of the track assembly is releasably attached to the bed by means of wedges 35. To this end apertures 36 are provided through all the spill plates and apertures 37 through the upright members 31 such that the wedges may be inserted therethrough from, in this case, the rear of the conveyor to secure these parts together. The bottom surfaces of the wedges abut the plate 32. When fully inserted the ends of the wedges will not usually project through the spill plate apertures. It is to be appreciated that it is possible to arrange the track assembly such that the wedges are inserted from the opposite side thereof. It will also be appreciated that the wedges can be arranged to operate at right angles to the manner described above, that is, parallel to the length of the conveyor.

To enable access to be gained to the track without the necessity of removing the track and spill plate assembly, openings 41 are provided in the plates 31 and 32 and through the bed plates 1 as shown in FIG. 3. Thus chain link pins, hinge pins and flight may be replaced on site and rock which has jammed in the track removed. Suitable means for instance cover plates (not shown) may be provided to close some or all of these openings.

A plurality of collapsible blast barricade assemblies 38, one of which is shown in FIG. 3, are connected to the spill plate assembly near the top front edge thereof to enclose a space between the working face of the mine and the rear of the conveyor. These barricade assemblies are conveniently suspended from hooks 39 carried by props 40. The barricade can conveniently consist of a plurality of flat plates connected in series by chains located near the ends of the plates. These chains will constrain relative movement between adjacent plates.

Trough shaped members 48 will preferably be attached to the assembly behind the spill plates 34 to carry the necessary hoses and electrical cables for the conveyor.

The reciprocation of the chain 5 can be effected in different ways but preferably a hydraulic piston and cylinder assembly at each end of the conveyor will be used. The end of such an installation is illustrated in FIGS. 7 and 8 of the drawings. The assemblies operate in turn to reciprocate the chain and it is to be appreciated that the latter is driven positively in each direction. The hydraulic pressure is adapted for connection to the crown side of each assembly.

With reference to FIG. 7 which illustrates a simple case, the conveyor chain 5 is connected at each end to a link chain or rope 70 or other suitable flexible element which passes around two space pulleys 71 and 72, mounted adjacent the conveyor edge 3 and approximately within the length of the bed. In this case, the pulleys are rotatably mounted about axes normal to the plane of the bed 1 and the link chain describes an approximately 180° turn around each. The link chain is anchored at its end 73 and the pulley 72 is movable towards and away from the pulley 71.

At each end, the hydraulic piston and cylinder assembly is mounted substantially between the pulleys with the cylinder fixed relative to the bed. In this case, the longitudinal axis of the assembly is parallel to the length of the conveyor and the protruding piston rod 74 of the piston is attached to the movable pulley 72. The axis of the pulley 72 is thus normal with the axis of the cylinder assembly.

The above described arrangement exhibits many advantages. Firstly it is a neat and compact arrangement which is generally highly desirable in cases where the conveyor is to be used in the working spaces of underground mines. The crown side connection of each hydraulic assembly as opposed to connection of each hydraulic assembly as opposed to connection of the load to the other side results in a more efficient system since a larger area of piston face is acted on by the pressurized hydraulic fluid. The opening for the piston rod is on the low pressure side which reduces leaks. Also, the forces are localized to the cylinder and to the closely adjacent mounting (not shown) for the pulley 7.

The pulley and link chain or rope arrangement amplifies the stroke of the piston as applied to the corresponding end of the conveyor chain resulting in further space saving.

Through conventional and readily available hydraulic controls for such assemblies, it is possible to achieve many advantages in the practical operation of the conveyor. For example any jamming of material will ensure that only a predetermined load will be applied to the equipment before the stroke is reversed. Relief valves are preferably used to automatically reverse the working stroke of the conveyor to release material causing the jamming. Also valves can be located along the length of the conveyor as safety measure to ensure that when maintenance or repairs are being effected it will not be possible to operate the conveyor from a point remote from such repairs.

A series of spaced formations (not shown) may be provided for anchoring the end of the chain or rope and adjustment of the anchor point is allowed thereby. This latter feature facilitates the setting up of the conveyor and accommodates, within limits, varying lengths of conveyor chain and connected flexible member.

One alternative piston and pulley arrangement is illustrated in FIG. 8 where both pulleys are orientated with their planes parallel but inclined upwardly and away from the edge 3 of the bed 1. Again, the axis of the piston and cylinder assembly is parallel to the bed edge 3 but this is not essential. It is very desirable that this axis is in line with the center of the movable pulley. It is to be understood that under some circumstances the axis of the assembly may be inclined or at right angles to the edge 3 of the bed.

The advantages of such as arrangement are that of space saving, in that a compromise between height and width of the conveyor assembly is obtained, and that the inclination of the pulleys imparts a self-cleaning characteristic to the pulleys. Thus, dirt and pieces of rock on the pulleys will tend to slide and fall off on the latter. Again it is to be noted that the planes of the pulleys need not be parallel and may be inclined relative to each other. A suitable protective housing (not shown) may be provided to cover the piston and cylinder assemblies and pulleys.

The assembly of the piston and cylinder used to reciprocate the conveyor chain may if desired, be reversed to operate as a pulling rather than a pushing assembly. Further the cylinder may be coupled to the movable pulley 72 and the piston rod held stationary. Such an arrangement will allow the fluid conduits for the assembly to pass through the piston rod and also for there to be a protective sheath around the assembly which will enclose the piston rod when the assembly is in an extended condition.

Referring again to FIGS. 1 to 3, a plurality of spaced support members, or skids 42, are attached underneath the bed to the plates along and adjacent the longitudinal edge 3 of the bed. The skids may be made of short lengths of plate bent to substantially semi-circular cross section and are attached by welding to the plates such that they extend in length parallel to the bed edge 3. The skids cause the bed to slope downwardly towards its opposite longitudinal edge when the conveyor is located on a substantially horizontal floor.

In use the conveyor may be used with either conventional explosive mining techniques or with rock breaking machinery. The bed is preferably moved into operative positions using a system of hydraulic rams, but, any other convenient means may be employed. The hydraulic rams are located in spaced relationship behind the conveyor and are suitably anchored in position. The piston rods 46 are connected to the conveyor, as shown in FIG. 3, preferably by means of pivotted arms, 47. The orientation of the piston and cylinder can be reversed if necessary. Each arm 47 is pivoted about an axis parallel to the edge 3 of the bed and may be locked in different orientations so that the direction of the force exerted by the corresponding ram on the bed may be varied.

After a blasting operation, rock covers the bed and the chain is set in motion to clear the initial load of rock thereon along the conveyor. It is to be appreciated that there will be a greater mass of rock to be moved at the discharge end of the conveyor by the last flight at this end. This is because this flight must of necessity normally remove material from an area which is larger than that between any two consecutive flights along the length of the conveyor. For this reason a further aspect of the invention is that one or more flights at the discharge end of the conveyor (not shown) are made to have heights greater than the other flights of the conveyor. Because these flights have to move a greater mass of rock than those along the remainder of the conveyor and to prevent rock spilling back over these flights, they are increased in height. In fact the flight at the discharge end of the conveyor has to move the greatest amount of rock during each operative stroke and the height of this flight may be four or more times that of the central flights while the second to end flight may be made to at least twice the height of the central flights.

Because the flights are restricted to extended positions in which they define angles of less than 90° with the chain they attain their operative orientations earlier during the operative stroke of the chain than would otherwise be the case and have less distance to travel to the collapsed orientations during the return stroke. A relatively efficient operation results in that, for the particular lengths of stroke of the piston and cylinder assemblies, a greater area is swept by the flights than would be so if the flights could extend to positions normal to the chain. Alternatively the flights allow smaller and hence more compact, piston and cylinder assemblies to be employed to achieve a particular distance of sweep.

It is stressed that the invention is not confined in this respect to a maximum flight-chain inclination of 80° and inclinations of less than 90° are considered to fall within its scope. Of course, it must be realized that the efficiency of the conveyor will be very low if this angle is very small, and 80° is considered to be optimal.

The second advantage of the inclined flights is evident when considering the downward slope of the bed towards the front or leading edge thereof. In this case, rock on the conveyor will tend to slide off the bed but the inclination of the flights conteracts this tendency.

After the majority of the rock on the bed has been removed by the flights from the bed, the protruding tips 11 of the flights displace rock at the bottom of the rock pile naturally formed in front of the conveyor and thereby cause a progressive collapsing of the pile onto the bed as indicated by arrow 'A' in FIG. 3. The loading of the conveyor is thereby enhanced and furthermore, advance of the conveyor is facilitated by the clearing of rock ahead thereof.

It is not considered essential that the flight tips project beyond the leading edge of the conveyor and even if the tips extend only up to the edge 3 rock piles ahead of the conveyor will be caused to collapse as the bed is urged forwardly.

Once the bed has been cleared the barricade is collapsed and the rams 43 activated to force the conveyor bed forwards towards the working face and to clear the remaining rock ahead of the bed. The skids 42 raise the level of the bed out of contact with obstructing bumps and the like on the floor and hence allow the bed to be more easily advanced. Furthermore, because the skids are spaced apart, some obstructions on the floor may pass freely through the gaps at the rear of the bed when the conveyor is advanced. Also, the resulting inclination of the bed provides a lower contact between the flight tips and rock ahead of the conveyor. Usually the conveyor will be in continuous operation while the bed is being advanced into the rockpile which is to be conveyed away.

While it is considered advantageous to have a plurality of spaced skids underneath the bed, a predominantly continuous skid along and beneath the rear edge of the bed may be provided. During advance, the front edge of the bed may tend to "dig in" to the rock or the floor and to this end, as illustrated in FIGS. 1 to 3 a rib 45 is provided underneath each plate parallel to and adjacent the leading edge of the bed. When the plates are assembled to form the bed, the various ribs form a predominantly continuous rib along the leading edge of the bed, small discontinuities being encountered where the plates join and when the latter are spaced as allowed by the articulation.

The presence of the rib effectively forms a cavity under the bed of the conveyor which provides, in conjunction with the skids, a space for uneveness and bumps in the floor to project without contacting the conveyor.

The rib has further possible uses, however, and particularly may serve as a guide for a plurality of devices 110 which are preferably included in the conveyor assembly. One preferred type of device is now described, the purpose thereof being to assist the advance of the conveyor. The devices are substantially U-shaped, as shown in FIGS. 1, 2, 3, and 11 and are movably mounted on and around the front edge of the bed. Each device in this case comprises an elongated member having a pair of spaced parallel projections or limbs 111 projecting transversely from each end of the member. Both pairs are approximately parallel and project in the same direction.

The device is mounted with the limbs 111 accommodating the front edge of the plate and is guided on the edge by the rib mounted underneath the bed.

Figure 14:
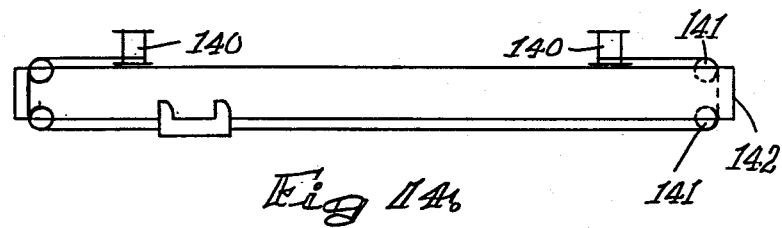
FIG. 14 is a diagrammatic view of the drive for the device mounted on the front edge of the conveyor.

The devices are interconnected by a rope or the like and means are provided to reciprocate the devices along the edge in advance of the conveyor. The means may comprise the rope being connected to the devices and to drum winches at each end of the conveyor. One such arrangement is illustrated diagrammatically in FIG. 14 where a pair of winches 140 are used. It is to be noted that the pulley 141 and rope 142 at the discharge end 143 of the conveyor are located below the bed 1 to prevent interference therewith by the rock being conveyed. At the opposite end this is not so important and the pulleys and rope can be above the bed. Alternatively the means may be hydraulic piston and cylinder assemblies mounted at the ends of the conveyor. As indicated at 113, the bottom longitudinal edge of the device is chamfered or cut-away as well as the bottom outer edges of each of the limbs beneath the conveyor bed. This is most clearly seen in FIGS. 11 and 12. The upper outer edge 112 of that limb of each device facing the operative face of a flight is chamfered. In the present case where a certain amount of articulation is afforded to the conveyor flights, the latter will ride up the chamfered edge 112 and over the agitator should they come into contact during conveying motion of the flight. When the latter are on the return stroke they could encounter the opposite face of the agitator and this is profiled so that such contact will tend to swing the flights parallel to the length of the conveyor.

In use, the reciprocating devices 110 serve as agitators for the rock ahead of the conveyor. The devices reciprocate along the leading edge with the surfaces of the limbs abutting the bed serving as bearings. The devices clear away the rock ahead of the bed and reduce fouling between the bed and pieces or rock. Advance of the conveyor is thereby facilitated. The chamfered edges 113 of each agitator allow the bed to climb and ride over rock ahead of the conveyor in cases where the rock is not cleared by the flight tips or the devices and also facilitate lateral movement of the agitator over obstructions on the floor. Thus, the devices assist in lifting the leading edge of the conveyor over bumps and obstructions which are not cleared away.

Furthermore, the action of the devices may assist in causing collapse of rock piles ahead of the conveyor on to the conveyor bed.

Other arrangements of the device are possible and, in particular, the rib 45 may be made to project forwardly and below the level of the leading edge of the bed. This is shown in FIG. 1. In this case the upper surface of the device may be level with the upper surface of the bed and interference with the flight tips may thus be obviated. The invention does however envisage that it may be desirable under certain circumstances to have the rib 45 run along the upper surface of the leading edge.

Figure 13:
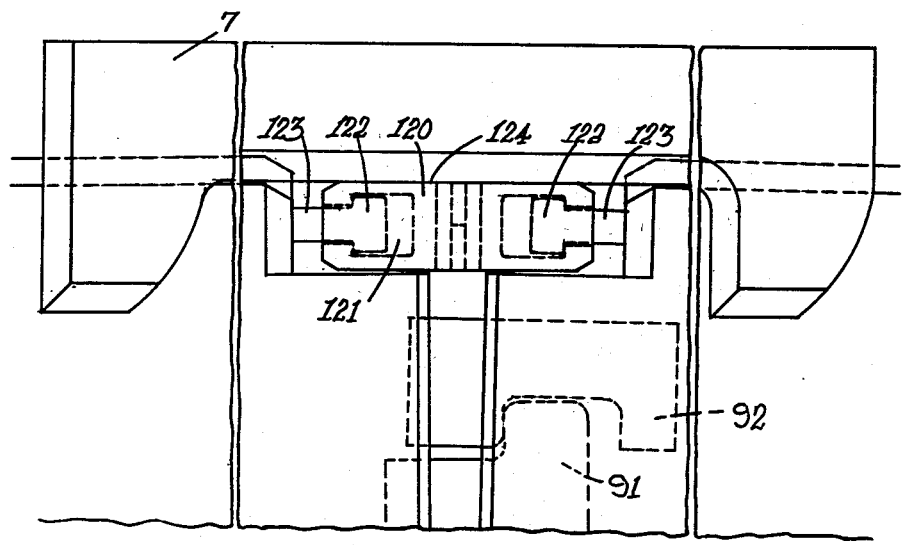
FIG. 13 is a partly sectioned plan of the conveyor bed.

It is to be appreciated that, in use, considerable gaps between the adjacent edges of the articulated plates 1 arise, particularly in the rough and undulating conditions in underground mines. These gaps present discontinuities in the paths of travel of the agitating devices and also, the relative inclinations of the plates make the paths of travel on the devices tortuous and difficult to negotiate. In order to overcome this problem and to obviate the necessity of enlarging the sizes of the devices to enable them to bridge the gaps and to accommodate the angles of inclination of the plates, bridging pieces 120 are included in the conveyor assembly as shown in FIGS. 12 and 13. These bridging pieces effectively halve the widths of the gaps and halve the angles without limiting the desired degree of articulation of the bed.

As shown each bridging piece is substantially planar and rectangular and has two cavities 121 therein each of which constrains the enlarged end portion 122 of an arm 123 attached to one of the plates 1. The piece 120 is of the same thickness as each plate 1 and rib 45 and is located such that its one edge 124 is in line and level with the front longitudinal edge of the bed. Each cavity is larger than the end portion of the corresponding arm and a certain amount of relative movement between the piece and arms is thus afforded. Each bridging piece comprises two complementary portions and each of which forms approximately half of the cavities. The portions are releasably attached to allow the arm portions 121 to be located in and removed from the piece.

The adjacent front corners of each pair of articulated plates are cut out such that a recess is formed between the plates to accommodate the associated piece 120. Each arm is made from steel plate and the other end portions 125 thereof are enlarged and constrained in cavities in the plates. Relative longitudinal movement between the arms and the plates is thus allowed and it is readily apparent that the arrangement described above, while not interfering with the ability of the articulated plates to move relative to one another, effectively converts, as is shown in FIG. 13, the width of the gap encountered between a pair of plates to two gaps of approximately half the width. Also, the angle of inclination between the plates is effectively converted to two inclinations of half the angle. An agitating device moving along the front edge of the bed may therefore move more easily across the discontinuities.

The conveyor is urged by the rams up to the working face, rock being conveyed away during this movement. The conveyor is then withdrawn from the working face a sufficient distance to allow rock mined from the face in the next cycle of operations to be accommodated thereon and the barricade is again suspended in the extended operative position. The rams are also re-anchored nearer the working face. After a blasting the conveyor is again set in motion and a working cycle as described above is repeated.

The invention thus provides a rock conveyor well suited to the rough conditions encountered in mines. The articulation of the bed ensures that variations in both the surface on which it is set up and the working face can be adequately accommodated. The conveyor is of simple and robust construction, easy to repair when necessary and has a particular advantage for mining installations in that it has a small overall height. Effective means are included for facilitating the advance of the conveyor and it should be noted that the reciprocating action of the flights to move rock in a step by step manner ensures that any jamming which may take place is of limited duration since the jamming will be released during the return stroke. This feature considerably affects the wear of the conveyor parts and the power required for its operation.

Preferably as much of the construction as possible will be fabricated by welding operations which is inexpensive but results in a strong overall assembly. Also those plates or components or parts thereof which are found to be subject to the greatest wear can be made to be readily replaceable or constructed from suitably hard material.

Figure 15:
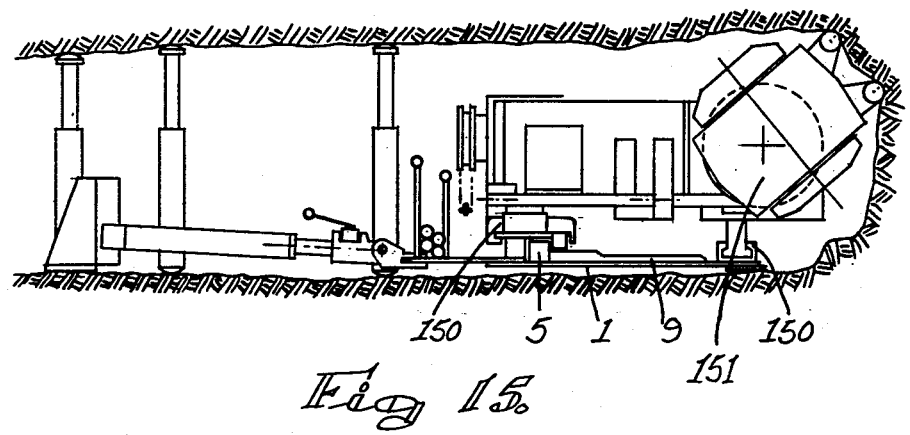
FIG. 15 illustrates a mining machine mounted on the conveyor.

Other embodiments of the invention are possible within its scope and, in particular, mining equipment such as drill rigs and rock cutting equipment may be mounted on the conveyor and be capable of moving along its length to perform a mining operation along the working face. In this case, the track assembly may have guide rails 150 mounted thereon for such equipment. One such arrangement is shown in FIG. 15 where a rock cutting machine 151 is mounted to run along the conveyor while cutting rock from the working face. This type of machinery does lend itself to continuous operation.

It is also considered that the drive assemblies particularly that part bearing the piston and cylinder assemblies should be supported in a protective housing. These latter should be connected to the ends of the conveyor to form a substantially rigid assembly so that no unnecessary bending loads are applied to the piston and cylinder assemblies.

Finally it is pointed out that the conveyor of this assembly is not confined to that above described. Where used with selective mining machinery it may be desirable to have the chain and track located along the leading edge of the conveyor as the latter is advanced towards a working face. With such an arrangement it may also be desirable to have the flights at the discharge end arranged to cause discharge rearwardly of the conveyor and one way in which this can be achieved is to have the flights inclined at angles greater than 90° rather than less than 90° as described in the preferred embodiment above.

What we claim as new and desire to secure by Letters Patent is:

1. A conveyor for use in underground mining operations comprising a conveyor bed of flat plates carrying articular members joined together in an articulated manner in a plane parallel to said plates to allow limited universal relative movement between said plates, an articular member defined by a rigid projection extending from each plate adjacent a transverse edge of each plate near a longitudinal edge of the bed, the projections providing between them co-operating hook and socket formations adapted to constrain adjacent transverse edges of the plates, the bed having a longitudinal free edge thereof to rest on the ground, a track mounted on the bed adjacent the opposite longitudinal edge thereof which accomodates and constrains therein a reciprocable chain of rigid links of substantially uniform cross-section hinged together to provide a substantially continuous face in a side of the track which is open and facing the free edge of the bed, a series of spaced flights hingedly attached directly to chain links between hinge points and arranged to extend across the bed, stops on each flight being provided to limit rotational movement of the flights in both directions over the surface of the bed, means connected to the chain near each end for reciprocating the chain under tension along the track and means for advancing the conveyor in use transverse of its length with the free edge forward to self load by insertion of said edge under a pile of material to be conveyed extending along a substantial part of the length of the conveyor.

2. A conveyor as claimed in claim 1 in which contiguous members in the chain are hinged together by one member having a projection from the end thereof located between complementary overlapping projections from the other member, apertures being provided through the projections and the members held together by a waisted pin positioned in the apertures with the waisted portion corresponding to the central projection from the one member.

3. A conveyor as claimed in claim 2 in which adjacent mating surfaces of the chain members are radiused about the hinge axis.

4. A conveyor as claimed in claim 1 in which said stops limit the rotational movement of the flights to orientations in which their conveying surfaces define maximum angles of less than 90° with the chain.

5. A conveyor as claimed in claim 1 in which the flights extend when transverse to the chain across and beyond the opposite edge of the bed.

6. A conveyor as claimed in claim 1 in which the flight at the discharge end of the conveyor is of greater height than any other flight.

7. A conveyor as claimed in claim 1 wherein one articular member defines a panel to overlap the gap between adjacent plate edges.

8. A conveyor as claimed in claim 7 in which further connecting means are provided on the plates for attaching the adjacent edge portions near the first longitudinal edge thereof to allow limited relative movement of the plates, said means comprising a flange on each plate extending transverse to the surface thereof and parallel to said transverse edge, the flanges being connected to allow limited relative movement between them and having the top and bottom edges of the flanges above and below the centre line of the conveyor chain.

9. A conveyor as claimed in claim 1 in which ancilliary equipment including a spill plate and at least part of the track assembly having openings through the walls thereof is attached to the bed by co-operating members held together with wedges.

10. A conveyor assembly as claimed in claim 1 in which the means for reciprocating the chain is at least one piston and cylinder assembly connected to the chain.

11. A conveyor as claimed in claim 10 in which a system of pulleys to increase the effect of the piston working stroke on the chain is used and in which the system comprises at least first and second spaced pulleys located approximately within the length of the conveyor at each end thereof and wherein the second pulley is movable away from the first; at least one elongated flexible member attached to each end of the conveyor member which passes round the first and second pulleys and is anchored at its other end; and a piston and cylinder assembly mounted at each end of the conveyor and connected to said second pulley and with the activating pressure for the assembly adapted for connection to the crown side thereof.

12. A conveyor as claimed in claim 11 in which said flexible member describes an approximately 180° turn around the second pulley and means are provided for adjustably anchoring the end of said member at positions along a line approximately parallel to its end portion.

13. A conveyor as claimed in claim 12 in which the center of the second pulley lies on the extended center line of the piston and cylinder assembly.

14. A conveyor as claimed in claim 1 in which a supporting skid is attached to each plate adjacent the first longitudinal edge to incline the bed.

15. A conveyor as claimed in claim 14 in which there is included a predominantly continuous rib on the underside of the bed extending parallel to and adjacent a second longitudinal edge thereof remote from the chain.

16. A conveyor as claimed in claim 15 in which at least one device is mounted adjacent and movable along the second edge of the bed, which device extends beyond and below this edge and is constrained thereon by the rib and includes a member having a pair of spaced and approximately parallel transverse limbs at each end with both pairs projecting from the same side of the member and in which a drive is provided to reciprocate the device along the edge.

17. A conveyor as claimed in claim 14 in which a bridging piece is located between each pair of adjacent plates of the bed adjacent the second longitudinal edge thereof, means being included for mounting the piece in this location and to allow movement of the piece toward and away from the adjacent edges of the plates.

18. A conveyor as claimed in claim 1 including a blast barricade attached thereto and adapted to extend upwardly from the edge of the conveyor where the track is located.

19. A flight for a conveyor having a bed of articulated plates, a track constraining a chain adjacent a first longitudinal edge of the bed, spaced flights attached to the chain and located to extend across the bed and means for reciprocating the chain along the track which flight is a shaped bar having one end adapted to be pivotally connected to the chain and which is reduced in its height towards the free end with its trailing edge tapered downwardly towards its bottom surface and inclined towards the leading edge near the free end which is chamferred said configuration facilitating movement beneath the conveyed material during the return stroke of said chain.

* * * * *